US008670662B2

(12) United States Patent
Healey et al.

(10) Patent No.: US 8,670,662 B2
(45) Date of Patent: Mar. 11, 2014

(54) EVALUATING THE POSITION OF AN OPTICAL FIBER DISTURBANCE

(75) Inventors: Peter Healey, Ipswich (GB); Edmund Sikora, Swilland (GB)

(73) Assignee: British Telecommunications Public Limited Company, London (GB)

( * ) Notice: Subject to any disclaimer, the term of this patent is extended or adjusted under 35 U.S.C. 154(b) by 792 days.

(21) Appl. No.: 12/295,784

(22) PCT Filed: Mar. 30, 2007

(86) PCT No.: PCT/GB2007/001188

§ 371 (c)(1),
(2), (4) Date: Oct. 2, 2008

(87) PCT Pub. No.: WO2007/113527

PCT Pub. Date: Oct. 11, 2007

(65) Prior Publication Data

US 2009/0274456 A1 Nov. 5, 2009

(30) Foreign Application Priority Data

Apr. 3, 2006 (EP) .................................... 06251880

(51) Int. Cl.
*H04B 10/00* (2013.01)
*H04B 17/00* (2006.01)

(52) U.S. Cl.
USPC .................................. 398/20; 398/16; 398/17

(58) Field of Classification Search
USPC ............................................. 398/16, 17, 20
See application file for complete search history.

(56) References Cited

U.S. PATENT DOCUMENTS

| 4,297,887 A | 11/1981 | Bucaro |
| 4,370,610 A | 1/1983 | Allen |
| 4,397,551 A | 8/1983 | Bage et al. |
| 4,443,700 A | 4/1984 | Macedo et al. |
| 4,463,451 A | 7/1984 | Warmack et al. |

(Continued)

FOREIGN PATENT DOCUMENTS

| EP | 0 251 632 A2 | 1/1988 |
| EP | 0 360 449 A2 | 3/1990 |

(Continued)

OTHER PUBLICATIONS

Japanese Office Action for Japanese Application No. 2007-505635 mailed Aug. 17, 2010.

(Continued)

*Primary Examiner* — Nathan Curs
(74) *Attorney, Agent, or Firm* — Patterson Thuente Pedersen, P.A.

(57) ABSTRACT

The present invention relates to a method of and apparatus for evaluating the position of a time-varying disturbance on an optical waveguide. The steps include: transmitting sensing signals onto the optical waveguide, which sensing signals have imposed thereon a modulation which is dependent, at least in part, on their time of transmission; receiving returned sensing signals, which signals have been exposed to the disturbance; and, from the previously imposed modulation on the returned sensing signals, evaluating the position of the disturbance. Because the sensing signals have a modulation that is dependent at least in part on their transmission time, the round-trip time for the signals to travel to and from a disturbance can be inferred. From this round trip time, or a value related thereto, it is possible to directly or indirectly evaluate the position of the disturbance.

14 Claims, 3 Drawing Sheets

(56) References Cited

U.S. PATENT DOCUMENTS

| | | |
|---|---|---|
| 4,538,103 A | 8/1985 | Cappon |
| 4,572,949 A | 2/1986 | Bowers et al. |
| 4,593,385 A | 6/1986 | Chamuel |
| 4,649,529 A | 3/1987 | Avicola |
| 4,654,520 A | 3/1987 | Griffiths |
| 4,668,191 A | 5/1987 | Plischka |
| 4,688,200 A | 8/1987 | Poorman et al. |
| 4,697,926 A | 10/1987 | Youngquist et al. |
| 4,708,471 A | 11/1987 | Beckmann et al. |
| 4,708,480 A | 11/1987 | Sasayama et al. |
| 4,770,535 A | 9/1988 | Kim et al. |
| 4,781,056 A | 11/1988 | Noel et al. |
| 4,805,160 A | 2/1989 | Ishii et al. |
| 4,847,596 A | 7/1989 | Jacobson et al. |
| 4,885,462 A | 12/1989 | Dakin |
| 4,885,915 A | 12/1989 | Jakobsson |
| 4,897,543 A | 1/1990 | Kersey |
| 4,907,856 A | 3/1990 | Hickernell |
| 4,976,507 A | 12/1990 | Udd et al. |
| 4,991,923 A | 2/1991 | Kino et al. |
| 4,994,668 A | 2/1991 | Lagakos et al. |
| 4,994,886 A | 2/1991 | Nadd |
| 5,004,912 A | 4/1991 | Martens et al. |
| 5,015,842 A | 5/1991 | Fradenburgh et al. |
| 5,025,423 A | 6/1991 | Earp |
| 5,046,848 A | 9/1991 | Udd et al. |
| 5,051,965 A | 9/1991 | Poorman |
| 5,093,568 A | 3/1992 | Maycock |
| 5,104,391 A | 4/1992 | Ingle et al. |
| 5,140,559 A | 8/1992 | Fisher |
| 5,173,743 A | 12/1992 | Kim |
| 5,187,362 A | 2/1993 | Keeble |
| 5,191,614 A | 3/1993 | LeCong |
| 5,194,847 A | 3/1993 | Taylor et al. |
| 5,206,924 A | 4/1993 | Kersey |
| 5,223,967 A | 6/1993 | Udd |
| 5,307,410 A | 4/1994 | Bennett |
| 5,311,592 A | 5/1994 | Udd |
| 5,313,266 A | 5/1994 | Keolian et al. |
| 5,319,609 A | 6/1994 | Regnault |
| 5,351,318 A | 9/1994 | Howell et al. |
| 5,355,208 A | 10/1994 | Crawford et al. |
| 5,359,412 A | 10/1994 | Schulz |
| 5,361,130 A | 11/1994 | Kersey et al. |
| 5,363,463 A | 11/1994 | Kleinerman |
| 5,373,487 A | 12/1994 | Crawford et al. |
| 5,379,357 A | 1/1995 | Sentsui et al. |
| 5,384,635 A | 1/1995 | Cohen |
| 5,412,464 A | 5/1995 | Thomas et al. |
| 5,453,827 A | 9/1995 | Lee |
| 5,457,998 A | 10/1995 | Fujisaki et al. |
| 5,473,459 A | 12/1995 | Davis |
| 5,491,573 A | 2/1996 | Shipley |
| 5,497,233 A | 3/1996 | Meyer et al. |
| 5,500,733 A | 3/1996 | Boisrobert et al. |
| 5,502,782 A | 3/1996 | Smith |
| 5,511,086 A * | 4/1996 | Su ................................. 372/31 |
| 5,592,282 A | 1/1997 | Hartog |
| 5,604,318 A | 2/1997 | Fasshauer |
| 5,636,021 A | 6/1997 | Udd |
| 5,637,865 A | 6/1997 | Bullat et al. |
| 5,663,927 A | 9/1997 | Olson et al. |
| 5,691,957 A | 11/1997 | Spiesberger |
| 5,694,114 A | 12/1997 | Udd |
| 5,754,293 A | 5/1998 | Farhadiroushan |
| 5,767,950 A | 6/1998 | Hawver et al. |
| 5,778,114 A | 7/1998 | Eslambolchi et al. |
| 5,936,719 A | 8/1999 | Johnson |
| 5,975,697 A | 11/1999 | Podoleanu |
| 5,982,791 A | 11/1999 | Sorin |
| 5,991,479 A | 11/1999 | Kleinerman |
| 6,072,921 A | 6/2000 | Frederick et al. |
| 6,075,628 A | 6/2000 | Fisher et al. |
| 6,115,520 A | 9/2000 | Laskowski et al. |
| 6,148,123 A | 11/2000 | Eslambolchi |
| 6,185,020 B1 | 2/2001 | Horiuchi et al. |
| 6,194,706 B1 | 2/2001 | Ressl |
| 6,195,162 B1 | 2/2001 | Varnham et al. |
| 6,211,950 B1 | 4/2001 | Walter |
| 6,269,198 B1 | 7/2001 | Hodgson et al. |
| 6,269,204 B1 | 7/2001 | Ishikawa |
| 6,285,806 B1 | 9/2001 | Kersey et al. |
| 6,315,463 B1 | 11/2001 | Kropp |
| 6,381,011 B1 | 4/2002 | Nickelsberg |
| 6,459,486 B1 | 10/2002 | Udd et al. |
| 6,487,346 B2 | 11/2002 | Nothofer |
| 6,489,606 B1 | 12/2002 | Kersey et al. |
| 6,594,055 B2 | 7/2003 | Snawerdt |
| 6,625,083 B2 | 9/2003 | Vandenbroucke |
| 6,628,570 B2 | 9/2003 | Ruffa |
| 6,704,420 B1 | 3/2004 | Goedgebuer et al. |
| 6,788,417 B1 | 9/2004 | Zumberge et al. |
| 6,813,403 B2 | 11/2004 | Tennyson |
| 6,859,419 B1 | 2/2005 | Blackmon et al. |
| 6,943,872 B2 | 9/2005 | Endo et al. |
| 7,006,230 B2 | 2/2006 | Dorrer et al. |
| 7,110,677 B2 | 9/2006 | Reingand |
| 7,266,299 B1 | 9/2007 | Bock et al. |
| 7,289,729 B1 | 10/2007 | Eslambolchi et al. |
| 7,397,568 B2 | 7/2008 | Bryce |
| 7,536,102 B1 | 5/2009 | Huffman et al. |
| 7,548,319 B2 | 6/2009 | Hartog |
| 7,656,535 B2 | 2/2010 | Healey et al. |
| 7,667,849 B2 | 2/2010 | Sikora et al. |
| 7,697,795 B2 | 4/2010 | Heatley et al. |
| 7,725,026 B2 | 5/2010 | Patel et al. |
| 7,755,971 B2 | 7/2010 | Heatley |
| 7,796,896 B2 | 9/2010 | Sikora et al. |
| 7,817,279 B2 | 10/2010 | Healey |
| 7,848,645 B2 | 12/2010 | Healey et al. |
| 7,961,331 B2 | 6/2011 | Healey |
| 7,974,182 B2 | 7/2011 | Healey et al. |
| 7,995,197 B2 | 8/2011 | Sikora et al. |
| 8,000,609 B2 | 8/2011 | Healey et al. |
| 8,003,932 B2 | 8/2011 | Sikora et al. |
| 8,027,584 B2 | 9/2011 | Healey |
| 2001/0028766 A1 | 10/2001 | Hatami-Hanza |
| 2002/0196447 A1 | 12/2002 | Nakamura et al. |
| 2003/0103211 A1 | 6/2003 | Lange et al. |
| 2003/0117893 A1 | 6/2003 | Bary |
| 2003/0174924 A1 | 9/2003 | Tennyson |
| 2004/0027560 A1 | 2/2004 | Fredin et al. |
| 2004/0095569 A1 | 5/2004 | Kan |
| 2004/0113056 A1 | 6/2004 | Everall et al. |
| 2004/0201476 A1 | 10/2004 | Howard |
| 2004/0208523 A1 * | 10/2004 | Carrick et al. .................. 398/32 |
| 2004/0227949 A1 | 11/2004 | Dorrer et al. |
| 2006/0163457 A1 | 7/2006 | Katsifolis et al. |
| 2006/0256344 A1 | 11/2006 | Sikora et al. |
| 2007/0009600 A1 | 1/2007 | Edgren et al. |
| 2007/0065150 A1 | 3/2007 | Skora et al. |
| 2007/0127933 A1 | 6/2007 | Hoshida et al. |
| 2007/0264012 A1 | 11/2007 | Healey et al. |
| 2008/0013161 A1 | 1/2008 | Tokura et al. |
| 2008/0018908 A1 | 1/2008 | Healey et al. |
| 2008/0123085 A1 | 5/2008 | Sikora et al. |
| 2008/0166120 A1 | 7/2008 | Healtey et al. |
| 2008/0219093 A1 | 9/2008 | Heatley et al. |
| 2008/0219660 A1 | 9/2008 | Healey et al. |
| 2008/0232242 A1 | 9/2008 | Healey |
| 2008/0278711 A1 | 11/2008 | Sikora et al. |
| 2009/0014634 A1 | 1/2009 | Sikora et al. |
| 2009/0097844 A1 | 4/2009 | Healey |
| 2009/0103928 A1 | 4/2009 | Healey et al. |
| 2009/0135428 A1 | 5/2009 | Healey |
| 2009/0252491 A1 | 10/2009 | Healey |
| 2009/0274456 A1 | 11/2009 | Healey et al. |

FOREIGN PATENT DOCUMENTS

| | | |
|---|---|---|
| EP | 0364093 | 4/1990 |
| EP | 0 376 449 A1 | 7/1990 |
| EP | 0 377 549 | 7/1990 |
| EP | 0513381 | 11/1992 |

(56) References Cited

FOREIGN PATENT DOCUMENTS

| | | |
|---|---|---|
| EP | 0 592 690 A1 | 4/1994 |
| EP | 0 794 414 A2 | 9/1997 |
| EP | 0 821 224 A2 | 1/1998 |
| EP | 0 953 830 A2 | 11/1999 |
| EP | 1 037 410 A2 | 9/2000 |
| EP | 1 096 273 A2 | 5/2001 |
| EP | 1236985 | 9/2002 |
| EP | 1 385 022 A1 | 1/2004 |
| EP | 1 496 723 A1 | 1/2005 |
| FR | 2 751 746 | 1/1998 |
| GB | 2 015 844 A | 9/1979 |
| GB | 2 019 561 A | 10/1979 |
| GB | 2 113 417 A | 8/1983 |
| GB | 2 126 820 A | 3/1984 |
| GB | 2 205 174 A | 11/1988 |
| GB | 2 219 166 A | 11/1989 |
| GB | 2 262 803 A | 6/1993 |
| GB | 2 264 018 A | 8/1993 |
| GB | 2 401 738 A | 11/2004 |
| JP | 4115205 | 4/1992 |
| JP | 2001-194109 | 7/2001 |
| WO | WO 93/25866 A1 | 12/1993 |
| WO | WO 97/05713 A1 | 2/1997 |
| WO | WO 01/67806 A1 | 9/2001 |
| WO | WO 02/065425 A1 | 8/2002 |
| WO | WO 03/014674 A2 | 2/2003 |
| WO | WO 2005/008443 A2 | 1/2005 |
| WO | WO 2005/095917 * 10/2005 ............ G01M 11/00 |  |

OTHER PUBLICATIONS

Application and File History of U.S. Appl. No. 11/918,434, Inventor: Healey, filed Oct. 12, 2007.
Application and File History of U.S. Appl. No. 11/885,275, Inventor: Heatley, filed Aug. 29, 2007.
Application and File History of U.S. Appl. No. 11/885,400, Inventor: Heatley, filed Aug. 30, 2007.
U.S. Appl. No. 10/573,266, filed Mar. 23, 2006, Sikora et al.
U.S. Appl. No. 11/403,200, filed Apr. 13, 2006, Sikora et al.
U.S. Appl. No. 11/791,927, filed May 31, 2007, Sikora et al.
U.S. Appl. No. 11/791,923, filed May 31, 2007; Healey et al.
U.S. Appl. No. 11/663,954, filed Mar. 28, 2007, Sikora et al.
U.S. Appl. No. 11/663,957, filed Mar. 28, 2007, Healey et al.
U.S. Appl. No. 11/885,275, filed Aug. 29, 2007, Heatley et al.
U.S. Appl. No. 11/885,400, filed Aug. 27, 2007, Heatley et al.
U.S. Appl. No. 11/916,054, filed Nov. 30, 2007, Sikora et al.
U.S. Appl. No. 11/887,382, filed Sep. 28, 2007, Healey et al.
U.S. Appl. No. 11/918,434, filed Oct. 12, 2007; Healey et al.
U.S. Appl. No. 12/280,047, filed Aug. 20, 2008, Healey.
U.S. Appl. No. 12/280,038, filed Aug. 20, 2008, Healey.
Office Action dated Sep. 19, 2008 in U.S. Appl. No. 10/573,266.
Office Action dated Mar. 17, 2009 in U.S. Appl. No. 10/573,266.
Office Action dated Jan. 23, 2009 in U.S. Appl. No. 11/403,200.
Office Action dated Jun. 6, 2008 in U.S. Appl. No. 11/403,200.
Office Action dated Aug. 23, 2007 in U.S. Appl. No. 11/403,200.
Office Action dated Mar. 25, 2009 in U.S. Appl. No. 11/885,275.
Office Action dated Jul. 7, 2009 in U.S. Appl. No. 11/885,400.
Office Action Jan. 14, 2009 in U.S. Appl. No. 11/885,400.
Office Action dated May 14, 2009 in U.S. Appl. No. 11/916,054.
Office Action dated Jul. 8, 2009 in U.S. Appl. No. 11/791,927.
Office Action dated Sep. 5, 2008 in U.S. Appl. No. 11/791,923.
Office Action dated Feb. 26, 2009 in U.S. Appl. No. 11/791,923.
Gupta et al., "Capacity Bounding of Coherence Multiplexed Local Area Networks Due to Interferometric Noise," IEE Proc.-Optoelectron., vol. 144, No. 2, pp. 69-74, Apr. 1997.
Liang et al., "Modified White-Light Mach Zehnder Interferometer for Direct Group-Delay Measurements," Applied Optics, vol. 37, Issue 19, Abstract, Jul. 1998.
Jang et al., "Noncontact Detection of Ultrasonic Waves Using Fiber Optic Sagnac Interferometer," IEEE Transactions on Ultrasonics, Ferroelectrics, and Frequency Control, vol. 49, No. 6, Jun. 2002, pp. 767-775.
International Search Report mailed Jun. 30, 2006 [dated Jun. 7, 2006] in PCT/GB2006/001173.
International Search Report mailed Jul. 17, 2007 in PCT/GB2007/001188.
Yilmaz M. et al., "Broadband vibrating quartz pressure sensors for tsunameter and other oceanographic applications," Oceans '04, MTTS/IEEE Techno-Ocean '04, Kobe, Japan, Nov. 9-12, 2004, Piscataway, NJ, USA, IEEE, Nov. 9, 2004, pp. 1381-1387, XP010776555; Internet version, Oceans 2004, Kobe, Japan, pp. 1-7, Redmond, WA USA.
Szustakowski et al., Recent Development of Fiber Optic Sensors for Perimeter Security, Military University of Technology, IEEE 2001, pp. 142-148.
"Fading Rates in Coherent OTDR," Electronics Letters, vol. 20, No. 11, May 24, 1984.
International Search Report for PCT/GB2005/003680 mailed Dec. 1, 2005.
International Search Report dated Nov. 22, 2005.
International Search Report for PCT/GB2005/003594 dated Dec. 16, 2005.
International Search Report mailed Jan. 14, 2005 in International Application No. PCT/GB2004/004169.
International Search Report mailed May 8, 2006 in PCT/GB2006/000750.
International Search Report mailed May 29, 2006 in PCT/GB2006/000759.
International Search Report mailed Jun. 30, 2006, dated Jun. 7, 2006, in PCT/GB2006/001173.
International Search Report mailed Jul. 27, 2006 in PCT/GB2006/001993.
International Search Report mailed Apr. 13, 2007 in PCT/GB2007/000360.
International Search Report mailed Apr. 18, 2007 in PCT/GB2007/000343.
International Search Report mailed May 2, 2007 in PCT/GB2007/000359.
International Search Report dated May 16, 2006 in PCT/GB2005/004850.
International Search Report dated Mar. 15, 2006, mailed Mar. 24, 2006 in PCT/GB2005/004873.
International Search Report for PCT/GB2005/003594 mailed Dec. 16, 2005.
International Search Report mailed May 24, 2006 in PCT/GB2006/001325.
UK Search Report dated May 24, 2005 in GB506591.7.
UK Search Report dated Dec. 4, 2003 in GB Application No. GB 0322859.0.
International Search Report for PCT/GB2007/001188, mailed Jul. 17, 2007.
State Intellectual Property Office of China, Rejection Decision, Application No. 200580009905.4, dated Dec. 4, 2009, 19 pages.
State Intellectual Property Office of China, Third Notification of Office Action, Application No. 200580009905.4 dated Jun. 19, 2009, 4 pages.
State Intellectual Property Office of China, Second Notification of Office Action, Application No. 200580009905.4 dated Mar. 27, 2009, 4 pages.
State Intellectual Property Office of China, Text of First Office Action, dated Aug. 15, 2008.
European Search Report, Application No. 05733029.2-1524, dated Apr. 6, 2010, 7 pages.
European Search Report, Application No. 05826466.4-2415, dated Jul. 27, 2010.
Application and File History of U.S. Appl. No. 12/280,038, Inventor: Healey, filed Aug. 20, 2008.
Application and File History of U.S. Appl. No. 11/663,954, Inventor: Sikora, filed Mar. 28, 2007.
Application and File History of U.S. Appl. No. 11/791,927, Inventor: Sikora, filed May 31, 2007.
Application and File History of U.S. Appl. No. 11/887,382, Inventor: Healey, filed Sep. 28, 2007.
Application and File History of U.S. Appl. No. 11/918,434 Inventor: Healey, filed Oct. 12, 2007.

(56) References Cited

OTHER PUBLICATIONS

Application and File History of U.S. Appl. No. 10/594,433, Inventor: Healey, filed Sep. 26, 2006.
Application and File History of U.S. Appl. No. 12/280,047, Inventor: Healey, filed Aug. 20, 2008.
Application and File History of U.S. Appl. No. 12/280,051, Inventor: Healey, filed Aug. 20, 2008.
Application and File History of U.S. Appl. No. 11/663,957, Inventor: Healey, filed Mar. 28, 2007.
Application and File History of U.S. Appl. No. 11/403,200, Inventor: Sikora, filed Apr. 13, 2006.
Application and File History of U.S. Appl. No. 10/573,266, Inventor: Sikora, filed Mar. 23, 2006.
Application and File History of U.S. Appl. No. 11/791,923, Inventor: Healey, filed May 31, 2007.
Application and File History of U.S. Appl. No. 11/885,275, Inventor: Healey, filed Aug. 29, 2007.
Application and File History of U.S. Appl. No. 11/885,400, Inventor: Healey, filed Aug. 30, 2007.
Application and File History of U.S. Appl. No. 11/916,054, Inventor: Sikora, filed Nov. 30, 2007.
European Office Action from European Application No. 07732242.8 dated Aug. 30, 2010.
International Preliminary Report on Patentability and Written Opinion for International Application No. PCT/GB2006/001173 dated Oct. 3, 2007.

\* cited by examiner

EVALUATING THE POSITION OF AN OPTICAL FIBER DISTURBANCE

This application is the U.S. national phase of International Application No. PCT/GB2007/001188, filed 30 Mar. 2007, which designated the U.S. and claims priority to filed Europe Application No. 06251880.8, filed 3 Apr. 2006, the entire contents of each of which are hereby incorporated by reference.

The present invention relates to a method of and apparatus for evaluating the position of a disturbance on a waveguide, in particular where the disturbance is a time-varying disturbance.

It is known to estimate the distance of an object using techniques know as Frequency Modulation Continuous Wave (FMCW), in which a frequency modulated signal is transmitted towards the object. However, such known techniques are not always convenient or sensitive when estimating the position to a time-varying disturbance, in particularly a time-varying disturbance along a waveguide.

According to one aspect of the present invention, there is provided a method of interferometrically evaluating the position of a time varying disturbance on an optical waveguide, including the steps of: transmitting sensing signals onto the optical waveguide, which sensing signals have imposed thereon a modulation which is dependent, at least in part, on their time of transmission; receiving returned sensing signals, which signals have been exposed to the disturbance; and, from the previously imposed modulation on the returned sensing signals, evaluating the position of the disturbance.

Because the sensing signals have a modulation that is dependent at least in part on their transmission time, the round-trip time for the signals to travel to and from a disturbance can be inferred. From this round trip time, or a value related thereto, it is possible to directly or indirectly evaluate the position of the disturbance.

Preferably, the imposed modulation will be a phase modulation. This will allow the intensity of the transmitted signals to be substantially constant. However, instead or addition, the amplitude of the sensing signals may be modulated. If the amplitude is modulated, and if as a result of the modulation the signal from an optical source is interrupted, the interruptions can be made short in comparison to the uninterrupted periods, thereby allowing a high sensitivity to be maintained.

The frequency of the modulation may be varied with time, preferably in a cyclic fashion. Alternatively or in addition, a binary code or other information may be modulated onto the sensing signals, preferably through phase modulation. An indication of the transmission time can then be obtained using an autocorrelation technique.

The sensing signals will preferably be formed as signal copies from an optical source signals. The optical source signal will preferably have a coherence time associated therewith, such that (normally random) phase changes in the optical source signal occur on the time scale of the coherence time. The signal copies need not be exact duplicates of one another. Although the random phase changes resulting from the incoherence of the optical source signal will preferably be common to each of a pair of signal copies, the imposed modulation on the signal copies may, but need not, be common to both copies of a pair. A phase modulator may be used to impose the phase modulation on the signals before the signals are launched onto the waveguide, or a portion thereof which is to be sensed.

Preferably, the signal copies will be transmitted along the transmissions link with a time delay relative to one another, such that there is a leading copy and a trailing copy. The returned leading copy can then be delayed relative to the previously trailing copy, such that both copies can be combined substantially in step with one another.

In a preferred embodiment, this is achieved using an interferometer stage, such as an un-balanced Mach Zehnder interferometer. In this preferred embodiment, the output from the optical source is fed to the interferometer, where the signal is copied, one copy being channelled to one path of the interferometer, the transit time associated with each path being different, such that a relative or differential delay results between the time at which the signal copies are transmitted from the interferometer stage. The same interferometer stage can then be employed to re-align the returned signal copies in a particularly convenient manner, since the relative delay imposed in the outbound direction will be the same as the relative delay imposed in the return direction, this being in each case determined by the difference in the transit times of the two paths.

The differential delay will preferably be chosen in dependence at least in part on the average coherence time of the source. The differential delay will preferably be much longer than the coherence time. Preferably, the ratio of the differential delay to the coherence time will be greater or equal to $10^3$ yet more preferably $10^5$ or even yet more preferably $10^7$.

The steps of copying output signals and transmitting the signals will preferably be carried out at a first location, a disturbance remaining detectable at distance of at least 1 km or even at least 10 km from the first location.

Further aspects of the invention are provided in the appended claims. The present invention will now be described in further detail below, by way of example only, with reference to the following drawing in which:

Figure 1:
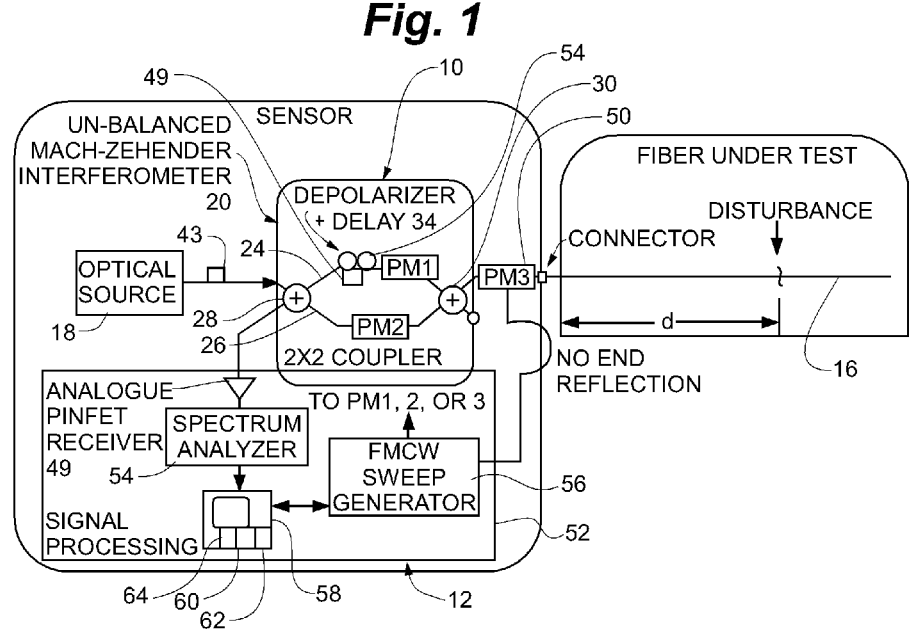
FIG. 1 shows on optical sensing system according to the present invention.

FIG. 1 shows a sensing system 10 in which a sensor station 12 is connected to an optical fibre 16 so as to sense a disturbance on the fibre 16. The sensor station 12 includes an optical source 18 for transmitting sensing signals onto the fibre, and an interferometer stage 20 between the light source 18 and the fibre 16. The interferometer stage 20, here a Mach Zehnder interferometer, has a first path 24 and a second path 26, the two paths 24, 26 being coupled at each end by a respective first and second coupling stage 28, 30. The optical source 18 is coupled to an input of the first coupling stage, such that for light travelling in the outbound direction (that is, towards the fibre 16), the first coupling stage 28 acts as a directional power (intensity) splitter, channelling light from the optical source to each of the paths 24, 26. The power to each path is shared in a predetermined manner: here, the power is shared 50:50, although a different ratio could be used. For each signal provided by the optical source 18, that signal is copied at the first coupling stage 28 such that there is a first copy and a second copy, one copy travelling along the first path 24, whilst the other copy travels along the second path 26.

The first path has a delay stage 34 for increasing the transit time of light travelling therealong such that the transit time for light travelling between the first and second coupling stage is 28, 30 is greater along the first path 24 than along the second 26 by a delay time D. The second coupling stage 30 combines light from the first and second paths, and channels this combined light towards the optical fibre 16. Thus, for signal produced by the optical source, the interferometer stage 20 serves to delay one of the signal copies relative to the other signal copy by a delay time D, signal copies being transmitted onto the optical fibre network 16 at different times to one another.

A phase modulator 50 is provided at an output of the second coupling stage 30 for modulating the phase of the sensing signals transmitted onto the fibre 16. The phase modulator 50 may be a piezoelectric modulator, or a modulator having a waveguide region whose refractive index is electric-field-dependent.

The source in this example is a continuous wave source, and the signals will therefore follow on from one another seamlessly, the distinction between successive signals being conceptual. However, the source may have some interruptions, provided that the source transmits light for a substantial proportion of the time. That is, if the continuous wave source has interruptions, the interruptions will be such that the mark space ratio is high, preferably greater than 5 or greater than 10. Although lower mark space ratios are possible, the lower the mark space ratio, the lower will be the sensitivity of the sensing system.

As the transmitted sensing signals travel along the fibre, these are progressively returned to the sensing station 12 by a process of distributed backscattering, here Rayleigh backscattering. A time-varying disturbance to the fibre will cause a phase change (in addition to that imposed by the phase modulator 50) which is detectable at the interferometer stage 20 as will be explained further below.

For signals travelling in the return direction, that is, towards the sensor station, the second coupling stage 30 acts as a power splitter, channelling a portion of the signal intensity to each of the first and second paths 24, 26. The first coupling stage 28 then serves to combine the return signals from the first and second paths, thereby generating an interference signal from which a disturbance along the fibre can be detected.

Because sensing signals returned from different positions along the fibre will arrive at the sensor station 12 at different times, it is possible to determine the position of the disturbance on the basis of the round trip time of the sensing signals to and from the disturbance. In the embodiment of FIG. 1, this is achieved with a signal processing stage 52, an input of which is connected to the first coupling stage of the interferometer, via an optical detector (here an analogue PIN-FET receiver 49) so as to receive the interference signal in the electrical domain. The signal processing stage 52 includes a sweep generator 56 for controlling the phase modulator 50 so as to modulate the phase of the sensing signals in a time-varying manner. In particular, the sweep generator 56 is configured to feed a modulator signal to the phase modulator 50 which signal controls the frequency at which the phase modulator 50 modulates the sensing signals. In this example, the modulator signal is a saw-tooth signal, causing the modulation frequency to increase linearly and then decrease abruptly in a cyclic fashion.

The signal processing stage 52 includes a spectrum analyser stage 54, which serves to filter the interferometer signal so as to recover the modulation imposed by the phase modulator 50 on the sensing signals, and thereby generate a frequency signal indicative of the modulation frequency.

A signal processing unit 58 is coupled to the spectrum analyser stage 54 and the sweep-generator stage 56. The signal processing unit 58, receives, on the one hand, a copy of the modulation signal from the sweep generator stage 56, which is indicative of the (time-dependent) frequency with which the phase modulator 52 modulates the outbound sensing signals. On the other hand, the signal processing unit 58 receives the frequency signal from the spectrum analyser stage 54, indicative of the modulation frequency of the returned sensing signals. The signal processing unit 58 includes a mixer stage 60 for mixing the modulation signal and the frequency signal, thereby providing a difference signal representative of the difference between the respective frequencies of the modulated signal and the frequency signal. Thus, if the modulation signal is representative of the modulation frequency fb 1(t), and the frequency signal is representative of modulation frequency f2(t), the difference signal will be a signal of frequency (or magnitude) f1(t)–f2(t).

Because the modulation frequency is linearly ramped, the difference signal will be proportional to the round trip time, and thus to the distance of the disturbance along the path of the fibre. On the basis of the difference signal, and the gradient with which the frequency is ramped, the signal processing unit 58 is configured to calculate the distance of the disturbance.

In more detail, this is achieved as follows: a monitoring stage 62 is provided for monitoring the interference signal from the interferometer stage 20, and generating a disturbance if the interference signal changes abruptly or according to predetermined criteria. A distance calculation stage 64 is coupled to the monitoring stage 62, and the mixer stage 60. In response to receiving a disturbance signal from the monitoring stage 62, the calculation stage 64 is configured to calculate the distance of the disturbance on the basis of: (i) the difference signal from the mixer stage 60; (ii) the gradient with which the frequency is ramped, that is the difference between the maximum and minimum frequency (delta f) divided by the ramp time (delta t); and, (iii) a velocity to position conversion factor. The various stages and units described above may be implemented in one or more suitable programmed processors connected to one or more memories.

Although the phase modulator 50 is shown in FIG. 1 connected to the output of the sweep generator 56, the phase modulator may be alternatively located in either one of the paths between the first and second coupling stages 28, 30. Experimentally, it has been found that the position shown in FIG. 1 for the phase modulator provides the strongest signal, but placing the phase modulator in either of the interferometer paths 24, 26 can be advantageous since this will reduce or avoid a beat-term frequency at 2/D where D is the differential delay through the interferometer stage 20.

The radiation produced by the optical source may be unpolarised, or alternatively a de-polarising unit 43 may be provided between the light source and the interferometer, for depolarising the light before the light is injected into the interferometer (the de-polarising unit may be for example, a Fibre Lyot de-polariser). A polarisation controller or de-polariser 49 may be provided in one of the paths of the interferometer, here, the first path, so that the polarisation of light from the first path combining in the return direction at the first coupler 28 is at least partially aligned with that of the light from the other path. A de-polariser also has the advantage of effectively scrambling any polarisation structure in the returning backscatter signal making it easier to detect loss defects.

Typically, the source will operate at a wavelength of between 1 micron and 2 microns, preferably around 1.3 or 1.55 microns, in order to efficiently make use of standard telecommunications optical fibre, such fibre being configured to support single mode transmission at this wavelength. Typically, the fibre will have a single core of a diameter which is around 9 or 10 microns. The source will normally be a broadband source, having a coherence time of less than 10 pico seconds, preferably less than 1 pico second, the delay D of the interferometer being preferably much larger than the coherence time. Typically, the interferometer will have a path difference of at least 5 km, preferably at least 10 km, or even at least 20 km: in addition to being longer than the coherence time, a long delay will make the sensing system more sensitive to low frequency disturbances.

To understand how a disturbance can be detected on the basis of the interferometer signal, it is helpful to consider the operation of the interferometer stage 20, which in effect serves to provide, for each signal produced by the source, time-displaced signal copies which are transmitted on to the optical fibre with a delay D relative to one another. This copying is a result of the action of the first coupling stage, which splits the light from the optical source onto the two paths of the interferometer. Considering return components of outbound signal copies return from a particular point along the fibre, for each signal generated by the source, there will be four resulting signals: a non-retarded signal S0 which has travelled along the second path 26 of the interferometer in both the forward and reverse directions; a first retarded signal S1 delayed by a delay D in the forward direction (but not the reverse direction); a second retarded signal S2 retarded by the delay D in the reverse direction (but nor the forward direction); and, a twice-retarded signal S3 retarded by a delay 2D, signal S3 being retarded in each of the forward and reverse directions.

The first and second retarded signals S1, S2 which are retarded in one direction only will be returned to the first coupling stage 28 at the same time. In the absence of any disturbance in the fibre 16, these signals are copies of one another (i.e. have the same phase or phase changes) and the signals will interfere or otherwise combine constructively at the first coupling stage 28. However, if one of the pair of the signals S1, S2 is modified relative to the other of the pair (as is likely to happen with a dynamic disturbance with a period P that is not such that P>>D), the signals S1, S2 will no longer interfere constructively. This will result in a change in the interference signal from the first coupling stage. In particular, a relative phase change in the signals S1,S2 will result in an amplitude change of the interference signal at an output of the first coupling stage.

A phase change on light travelling through the fibre will normally be effected by a physical disturbance. This is because a physical disturbance (caused for example by a displacement, an acoustic or ultrasound wave or other vibration) is likely to result in a change in the transmission properties of an optical fibre or other optical link. In particular, a physical disturbance such as that cause by a shock is likely to result in a time varying strain which will change the optical path length in the strained region of the light-carrying medium of the fibre (normally the silica glass core of the fibre), either through a change in the refractive index, polarisation, or a change in the physical length, or a combination of these.

Figure 2:
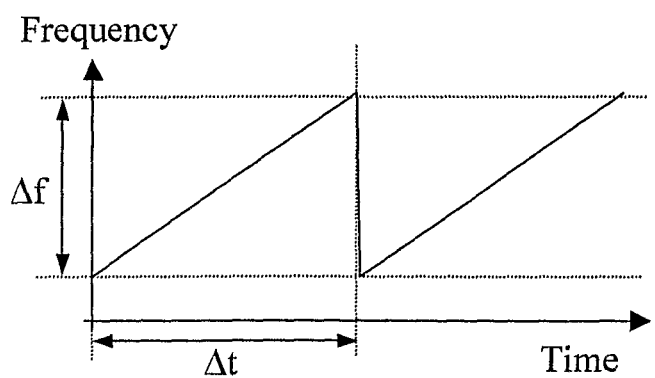
FIG. 2 is a trace illustrating the frequency variation with time of the modulation imposed on signals transmitted in the sensing system.

FIG. 2 shows a graph of the frequency of the modulation signal generated by the sweep generator 56 as a function of time. Here, delta_f (the extent of the frequency difference between the start and end of a ramp) is set to 10 MHz (sweeping between 5 MHz and 15 MHz) and delta_t (the duration of a ramp) is set to 10 ms. From this, and a velocity to (one way) position conversion factor of 10 us/km, the following mapping of position to frequency is obtained: d(km)=F(kHz)/10, where d is distance of the disturbance and F is the instantaneous difference in frequency between the modulation signal and the frequency signal of the sweep generator; that is, where F is given by f1(t)−f2(t). In general, position scales to frequency as: F≈d.c. delta_f/delta_t with dimensions [d (m), F (Hz), t (s)] and c is the velocity conversion factor, $c=10^{-8}$ [(s)/(m)].

Figures 3A, 3B:
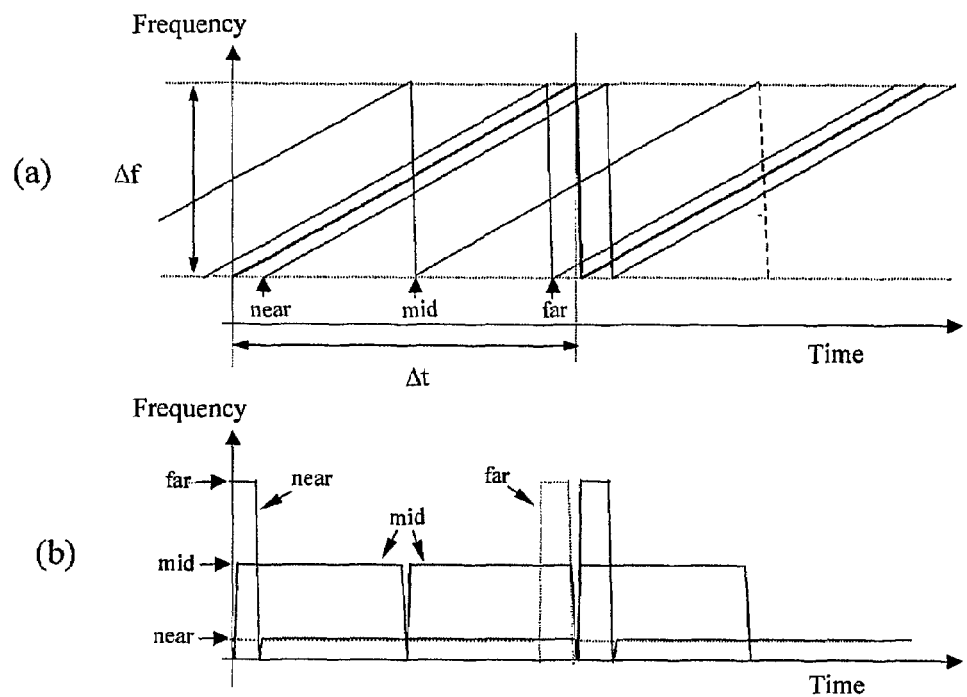
FIG. 3(a) shows the frequency-time variation of a transmitted signal and traces for signals returned from near, mid, and far positions.
FIG. 3(b) shows signals indicative of the frequency difference between the transmitted signal and signals returned from the near, mid, and far positions of FIG. 3(a)

Because of the cyclic nature of the modulation signal, different points along the trace of FIG. 2 but at the same stage of a cycle may give rise to the same difference signal (and thus indicate the same position), whereas in fact the different points correspond to different locations on the fibre 16. This is considered in more detail in FIGS. 3a and 3b. FIG. 3a shows the mixer input signals, that is, the modulator signal and the interferometer signal due to the reference chirp and reflections respectively, from three targets at near, mid and far ranges respectively. As can be seen from the resulting mixer output signals, that is, the difference signal, as shown in FIG. 3b, there is a range ambiguity for the near and far targets, since both produce the same output frequencies. This problem can be avoided by restricting the maximum range of the sensing system to delta_t2. This also restricts the mixer output frequency range of interest to delta_f/2.

Figures 4A, 4B:
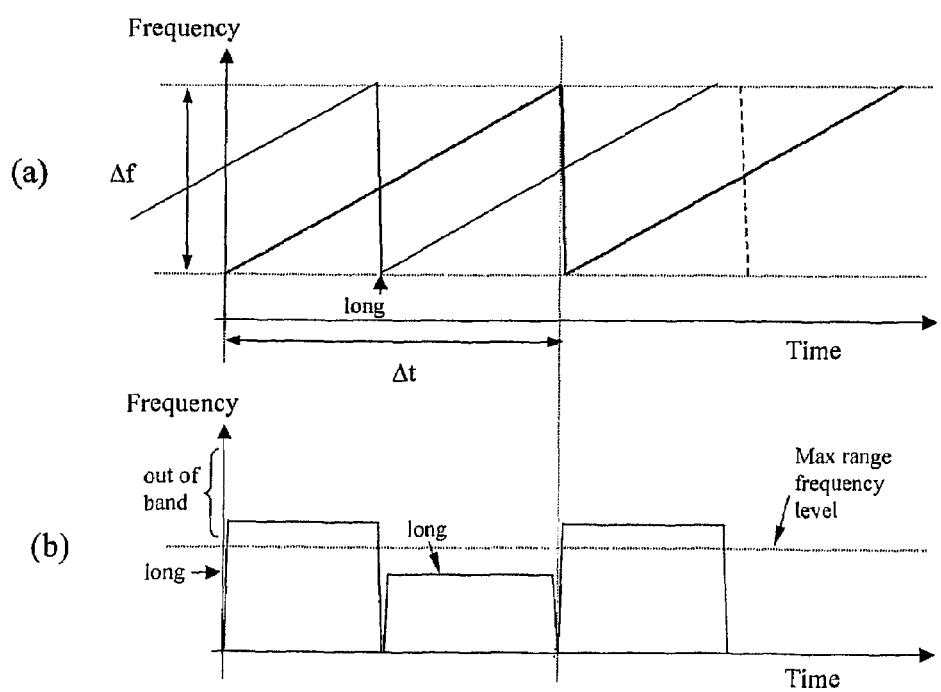
FIG. 4(a) shows the frequency-time variation of a transmitted signal and a returned signal.
FIG. 4(b) shows a signal indicative of the frequency difference between the transmitted signal and the returned signal of FIG. 4(a).

Another important feature of the mixer output signal (that is, the difference signal) for each range position is its combined time/frequency domain structure. FIG. 4 shows an example of this on/off structure for a target at long-range in a system designed with maximum range (less than delta_t/2). This on/off "keying" of the desired frequency tone from each range cell giving rise to modulation sidebands in the frequency domain can also lead to range ambiguity/decreased resolution. Note that when the tone at the desired frequency for the corresponding range disappears, it manifests itself as an out-of-band frequency as far as the receiver is concerned. It is clear from the above considerations that the out-of-band signals shown in FIG. 3b should be disregarded.

In light of the above considerations, characteristics of the frequency ramp (that is, the chirp) can be designed according to the following instructions: set the maximum range to, L (m)—then, delta_t>2.L.c; set the range-resolution to, delta_L (m); then the number of range cells, N=L/delta_L; set the sensor signal bandwidth, $B_s$; then each range cell bandwidth>2.$B_s$; and, thus, delta_f>4.$B_s$.(L/delta_L). Here, delta_t and delta_f are both a factor of 2 larger than you might expect in order to avoid range-ambiguity as explained above with reference to FIG. 3.

Example design: Let L=25 km; delta_L=25 m; and $B_s$=5 kHz. Then, delta_t>0.5 ms, delta_f>20 MHz, and N=1000 range bins. In this case the chirp might start at say 5 Mhz and sweep through to 25 MHz with a sweep repetition rate of 0.5 ms. (Although FIG. 2 shows a linear chirp, a staircase waveform might be easier to synthesise in a digital system.)

The optical receiver bandwidth would need to extend from dc to ~10 MHz (i.e., half the chirp bandwidth), however, it should be noted that signals from greater range will be at higher frequencies and will be much weaker than those from close by! Thus, some form of low-frequency de-emphasis might be advantageous. Ideally, in order to minimise the near-far problem (i.e., saturating the receiver with high power from near-by range cells) the optical front-end should be based on a high-pass filter circuit. An inductive feedback transimpedance preamplifier might have the desired characteristics.

The resolution of the technique depends on the distance to the target. This is because the beat-tone caused by a target at the maximum range has the shortest duration (see FIG. 4b). The worst-case resolution is given by delta_f~2/delta_t, which is approximately 4 kHz in this example. Range cells are spaced by ~2.$B_s$=10 kHz, thus the error is about 0.4×25 m or 10 m. However, this 4 kHz offset might allow a strong sensor signal in an adjacent cell to cause sufficient breakthrough to reduce the location accuracy by +/−25 m. This problem can be reduced by extending the chirp duration and frequency range. Thus, there is a design trade off between extending the sweep duration and range, and the degree of filtering needed to give good range-resolution whist not compromising the sensor bandwidth. Well-known non-linear pulse-compression chirp techniques may also be used to help reduce the range ambiguities caused by filter side lobes.

The sensor system output will comprise a non-stationary broad-spectrum signal from dc to delta_f/2, where each frequency resolution interval corresponds to a unique range along the fibre and the modulation sidebands within each frequency interval carry un-processed sensor information. The receiver processor therefore needs to synthesise a bank of N matched filters each of which feeds an envelope detector and FIFO to told the time history from each range cell. The following sensor processing sub-system must then recover the sensor signal corresponding to each location. Finally an analysis algorithm must detect the presence of a disturbance and produce the required output response. Other functions might include spectral shaping (e.g., low-frequency de-emphasis), signal averaging, and calibration.

One reason for modulating the sensing signals is to improve the sensitivity of the sensing system. In the present system, the optical source provides a continuous signal, whereas in other approaches, the source may be pulsed on for a small fraction (typically 1% or less) of the time. In principle, the present approach can lead to signal processing gains of over 20 dB.

In another embodiment, the sensing signals from the interferometer 20 are phase modulated with a binary sequence. To achieve this, the sweep generator 56 of FIG. 1 is replaced by a binary sequence generator. The modulated binary sequence is retrieved in the interference signal from the interferometer (which interference signal is derived from the backscattered sensing signals) and passed to an autocorrelator or a cross-correlator which replaces the signal processing unit 58 of FIG. 1. On the basis of this autocorrelation, the transmission time of the sensing signals is established relative to their return time, and the position of a disturbance detected in the sensing signals is there by evaluated.

In yet another embodiment, the phase modulator 50 of FIG. 1 is replaced with an amplitude modulator, so as to modulate the amplitude of the outbound sensing signals in a cyclic fashion, preferably in a sinusoidal fashion, at a constant frequency. The amplitude modulation is present in the interference signal, which can be compared with the signal driving the amplitude modulator, in an analogous manner to that carried out with the frequency modulation described above. In the case of amplitude modulation, the interference signal will be modulated at the same frequency as the outbound sensing signals, but will be phase-shifted by an amount corresponding to the round trip time to and from the disturbance. Thus, by evaluating the phase shift, the position of the disturbance can be determined. Again, in an analogous fashion to the frequency modulation technique, there will be an ambiguity when the phase difference is 360°. In order to address this ambiguity, a dual tone technique may be employed, in which the outbound sensing signals are modulated at two distinct frequencies, that is, with a high frequency and a low frequency. The high frequency may be used to obtain a goods spatial resolution, whilst the low frequency can be used to resolve the range ambiguity, if any, resulting from the high frequency signal.

As will be understood from the above description, a frequency modulation technique is applied to the optical domain, in particular using an incoherent light source whose optical bandwidth is greater than the frequency modulation bandwidth. Light is guided a long a waveguide having a path such that light is returned along the same waveguide portion in the reverse direction as was used to guide the light in the forward direction.

In summary, it will be seen that the embodiments above provide a sensitive way of estimating the position of a time-varying disturbance on a waveguide. Because the position of the disturbance is evaluated using the modulation imposed on sensing signals transmitted onto the waveguide, the need for the sensing signals to be form by short pulses with a long separation is reduced. Instead, it is possible for the sensing signals to be transmitted by a continuous wave source, thereby increasing the average intensity of returned (backscattered) light. As a result, the sensitivity of the method is increased.

The invention claimed is:

1. A method of interferometrically evaluating the position of a time varying disturbance on an optical waveguide, comprising:
   transmitting a plurality of outbound sensing signals from a continuous wave incoherent optical source onto the optical waveguide, which outbound sensing signals have imposed thereon a modulation by a modulation signal having a frequency which is dependent, at least in part, on the time of transmission of the outbound sensing signals, wherein the outbound sensing signals are guided along an outbound path along the optical waveguide;
   receiving disturbance sensing signals, which are progressively returned from the outbound path by a process of distributed backscattering, wherein the disturbance sensing signals have been exposed to the disturbance, wherein the disturbance sensing signals are returned in a reverse direction along a waveguide portion of the optical waveguide, the waveguide portion comprising the same waveguide portion used to guide the outbound sensing signals in the outbound direction; and
   using the previously imposed outbound modulation on the sensing signals, evaluating the position of the disturbance from the progressively returned disturbance sensing signals.

2. A method as claimed in claim 1, wherein the modulation has a component which varies in a cyclic fashion.

3. A method as claimed in claim 1, wherein the imposed modulation is a phase modulation.

4. A method as claimed in claim 3, wherein the phase is modulated with a frequency which varies linearly with increasing time.

5. A method as claimed in claim 1, wherein the outbound sensing signals are modulated with a frequency that increases with time from a lower level to an upper level, and upon reaching the upper level, returns to the lower level.

6. A method as claimed in claim 5, wherein the frequency varies in a saw-tooth like manner.

7. A method as claimed in claim 1, wherein the outbound sensing signals introduced into the waveguide are formed as pairs of signals, which signals of a pair are at least in part copies of one another.

8. A method as claimed in claim 7, wherein the copies of a given pair are introduced into the main line with a temporal offset relative to one another.

9. A method as claimed in claim 8, wherein the relative delay is undone, for received signals returned from the waveguide.

10. A method as claimed in claim 8, wherein the temporal offset is caused at an interferometer arrangement having a first path and a second path, the transit time of the first path being longer than that of the second path, copies of a pair being caused to travel along a different respective path to one another.

11. A method as claimed in claim 1, wherein the waveguide operates as a single mode waveguide.

12. A method as claimed in claim 1, wherein the outbound sensing signals are optical signals which are modulated using a frequency modulation technique applied to the optical domain using an incoherent light source whose optical bandwidth is greater than the frequency modulation bandwidth.

13. A map A method as claimed in claim 1, wherein the modulation is a phase modulation, and the method further comprises imposing, on the outbound sensing signals, an amplitude modulation.

14. Apparatus for interferometrically evaluating the position of a time varying disturbance on an optical waveguide comprising:

means for transmitting a plurality of outbound sensing signals from a continuous wave incoherent optical source on the optical waveguide, wherein the outbound sensing signals are guided along an outbound path along the optical waveguide;

means for imposing on the outbound sensing signals a modulation by a modulation signal having a frequency which is dependent, at least in part, on the time of transmission of the outbound sensing signals, means for receiving disturbance sensing signals which are progressively returned from the outbound path by a process of distributed backscattering, wherein the disturbance sensing signals have been exposed to the disturbance, and wherein the disturbance sensing signals are returned in a reverse direction along a waveguide portion of the optical waveguide, the waveguide portion comprising the same waveguide portion used to guide the outbound sensing signals in the outbound direction; and means for evaluating from the returned signals the position of the disturbance using the previously imposed modulation on the outbound sensing signals.

\* \* \* \* \*